March 21, 1939.　　　H. A. SILVEN　　　2,151,666
CRANKSHAFT GRINDING MACHINE
Filed Oct. 18, 1935　　　8 Sheets-Sheet 1

Inventor
HERBERT A. SILVEN
By Harold W. Eaton
Attorney

March 21, 1939.   H. A. SILVEN   2,151,666
CRANKSHAFT GRINDING MACHINE
Filed Oct. 18, 1935   8 Sheets-Sheet 3

Inventor
HERBERT A. SILVEN

Witness
John Riefe

By Harold W. Eaton
Attorney

March 21, 1939.  H. A. SILVEN  2,151,666
CRANKSHAFT GRINDING MACHINE
Filed Oct. 18, 1935  8 Sheets-Sheet 5

Inventor
HERBERT A. SILVEN

Witness
John Ruf

By Harold W. Eaton
Attorney

March 21, 1939.  H. A. SILVEN  2,151,666

CRANKSHAFT GRINDING MACHINE

Filed Oct. 18, 1935   8 Sheets-Sheet 6

Witness
John Reef

Inventor
HERBERT A. SILVEN
By Harold W. Eaton
Attorney

March 21, 1939.　　　　H. A. SILVEN　　　　2,151,666
CRANKSHAFT GRINDING MACHINE
Filed Oct. 18, 1935　　　　8 Sheets-Sheet 7

Inventor
HERBERT A. SILVEN
By Harold W. Eaton
Attorney

Patented Mar. 21, 1939

2,151,666

UNITED STATES PATENT OFFICE 2,151,666

CRANKSHAFT GRINDING MACHINE

Herbert A. Silven, Worcester, Mass., assignor to Norton Company, Worcester, Mass., a corporation of Massachusetts Application October 18, 1935, Serial No. 45,592

10 Claims. (Cl. 51—72)

This invention relates to grinding machines, and more particularly to a double head crankpin grinding machine.

One of the objects of this invention is to provide a simple, thoroughly practicable, readily controllable crankpin grinding machine. Another object is to provide a crankpin grinding machine with a single lever control which serves to control the various movements of the machine parts. Another object is to provide a crankpin grinding machine with a single lever control which serves to control the table traverse, the forward and rearward feeding movement of the grinding wheel, the positioning movement of the steadyrest, and the work clamp release.

It is a further object to provide a crankpin grinding machine with a spark splitting mechanism for axially moving the grinding wheel spindle within its bearings to equalize the side grinding of the wheel.

This invention accordingly consists in the features of construction, combinations of elements, and arrangements of parts as will be exemplified in the structure to be hereinafter described, and the scope of the application of which will be indicated in the following claims.

In the accompanying drawings, in which is shown one of various possible embodiments of the mechanical features of this invention.

A double head crankpin grinding machine has been illustrated in the drawings comprising a base 30 which supports a transversely movable wheel slide 31 carrying a rotatable grinding wheel 32 on a wheel spindle 33 journaled in the slide 31. The wheel slide 31 is arranged to slide transversely on ways 34 on the base 30. The grinding wheel may be rotated by any suitable source of power such as, for example, an electric motor 35 mounted on the upper surface of the wheel slide 31. The motor 35 is provided with a driving pulley 36 which is connected by driving belt 37 with a pulley 38 mounted on the end of the wheel spindle 33.

A longitudinally movable work table 40 is arranged to slide longitudinally of the base 30 on a V-way 41 and a flat way 42. The work table 40 is provided with a rotatable work support which is preferably of a double head type comprising a pair of opposed base work heads 45 and 46 which in turn rotatably support work holders 47 and 48 respectively.

Work clamping and rotating

Figure 1:
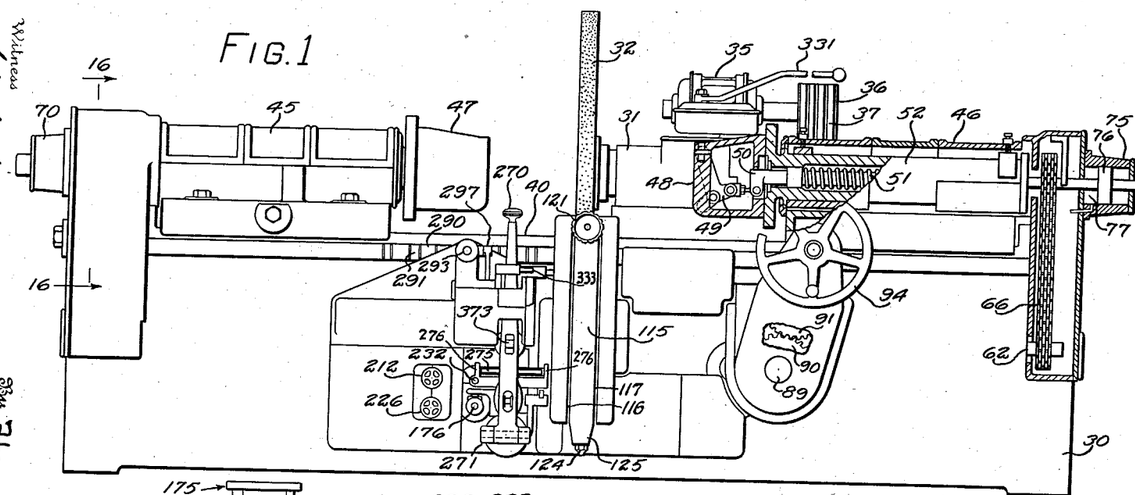
Fig. 1 is a front elevation of a crankpin grinding machine embodying this invention, having parts broken away and shown in section to more clearly show the construction.

The work supporting heads 47 and 48 (Figs. 1 and 2) are arranged to rigidly clamp a crankshaft therebetween and to synchronously rotate the opposite ends of the crankshaft. The work heads 47 and 48 have not been illustrated in detail since they do not constitute a part of the present invention. For further details as to the construction of the heads 47 and 48, reference may be had to the prior U. S. patent to Silven and Belden No. 1,837,342 dated December 22, 1931. As illustrated in Fig. 1, the work head 46 has been shown broken away to illustrate the construction of the head. The work holder 48 is provided with a toggle 49 arranged to actuate the clamping jaw. This toggle is actuated by a rod 50 which is normally urged toward the left, as viewed in Fig. 1, by means of a spring 51 within a rotatable work spindle 52. The spring 51 tends to move the rod 50 toward the left, as viewed in Fig. 1, to close the toggle and clamp the end of the crankshaft therein.

Figure 2:
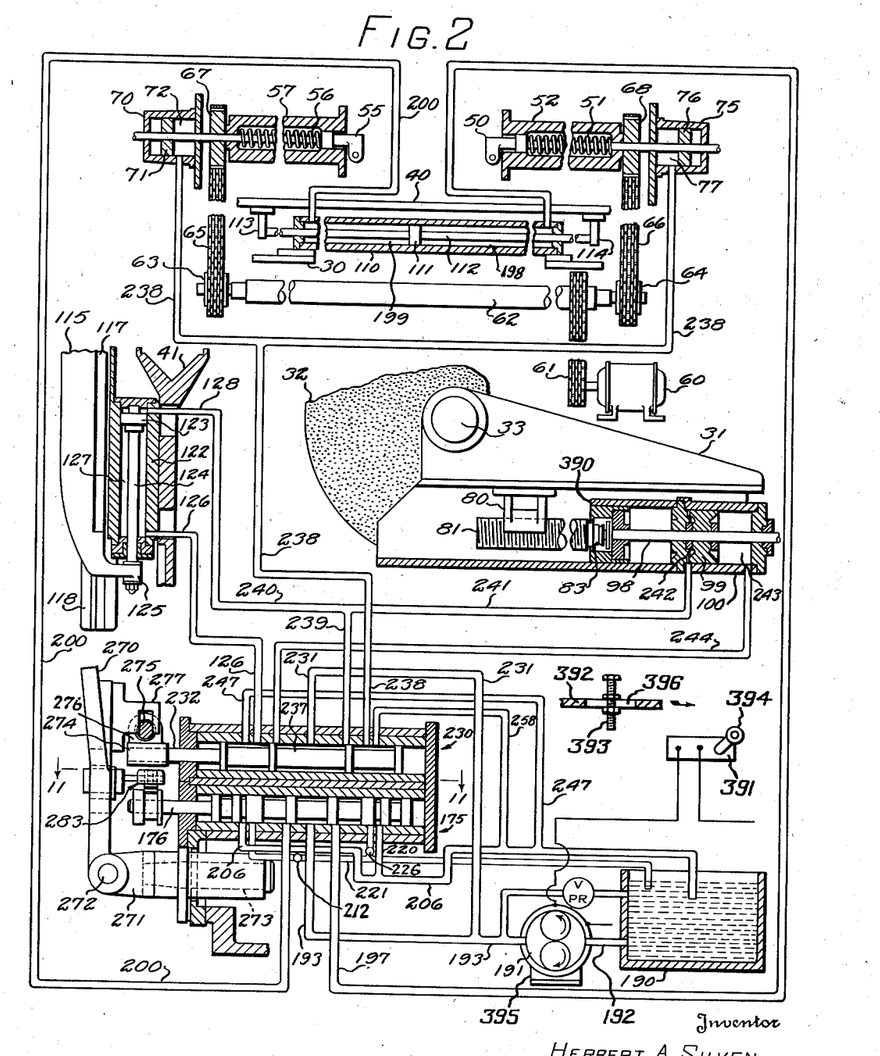
Fig. 2 is a fragmentary piping diagram of the hydraulic system.

The head 45 and work holder 47 are provided with a similar spring actuated toggle clamping mechanism for the left-hand end of the crankshaft to be ground, comprising a rod 55 and a spring 56 (Fig. 2) which tends to urge the rod 55 toward the right, as viewed in Fig. 2, to clamp the left-hand end of a crankshaft rigidly in position in the work holder 47. The rod 55 and spring 56 are contained within the work rotating spindle 57 which is rotatably supported in suitable bearings within the head 45.

The opposed work heads 47 and 48 are fixedly mounted on the inner ends of the work rotating spindles 57 and 52 respectively. The spindles 57 and 52 are rotated in synchronism with each other so that the shaft to be ground is gripped and rotated from its opposite end. An electric motor 60 is mounted within the base of the machine. The motor 60 is connected by a link chain 61 to rotate a longitudinally extending shaft 62 mounted in bearings (not shown) within the base 30. The shaft 62 is provided with sprockets 63 and 64 which are connected by link chains 65 and 66 respectively with sprockets 67 and 68 which are fixedly mounted on the outer ends of the work rotating spindles 57 and 52 respectively to transmit and synchronously rotate the work supporting and gripping heads 47 and 48 respectively. It will be readily apparent from the foregoing disclosure that rotation of the motor 60 serves to synchronously rotate the work supporting and gripping heads at opposite ends of the crankshaft to be ground.

In order that the work may be released from the work heads 47 and 48, a fluid pressure mechanism is provided to simultaneously unclamp each of the work clamps to release the same and allow the ground piece of work to be removed and a new crankshaft to be inserted thereinstead. This mechanism comprises a cylinder 70 (Figs. 1 and 2) which is mounted adjacent to the left-hand end of head 45. A piston 71 is slidably mounted within the cylinder 70 and is connected to the rod 55. When fluid is admitted to a cylinder chamber 72, the piston 71 is moved toward the left, as viewed in Fig. 2, to cause a corresponding movement of the rod 55 against the tension of the spring 56 to release the clamp on the left-hand work head 47.

A similar fluid pressure release is provided at the right-hand end of the machine, comprising a cylinder 75 having a piston 76 slidably mounted therein which is fixedly connected to the rod 50. When fluid under pressure is admitted to cylinder chamber 77, the piston 76 will be moved toward the right, as viewed in Figs. 1 and 2, to move the rod 50 in a corresponding direction to release the toggle 49 and thereby unclamp the right-hand end of the work piece.

Wheel feed

The wheel slide 31 (Figs. 2 and 3) may be moved transversely to feed the grinding wheel toward or from the work piece manually by means of a nut and screw mechanism comprising a nut 80 depending from the wheel slide 31 which meshes with a feed screw 81 rotatably journaled in bearings 82 and 83. A gear 84 is mounted on the outer end of the feed screw 81 and meshes with a gear 85 mounted on the rear end of a rotatable shaft 86. The front end of the shaft 86 is provided with a gear 87 meshing with a small gear 88 on the rear end of a rotatable shaft 89. The front end of the shaft 89 is provided with a gear 90 which meshes with a gear 91 rotatably mounted on a stud 92. The gear 91 meshes with a gear 93 which is formed integral with a manually operable hand wheel 94. The hand wheel 94 and gear 93 are rotatably mounted on a stud 95. By rotating the manually operable hand wheel 94, a rotary motion is transmitted through the gear 93, the gear 91, the gear 90, the shaft 89, the gear 88, the gear 87, the shaft 86, the gear 85, the gear 84, to rotate the feed screw 81 so as to cause a forward or rearward feeding movement of the wheel slide 31 and grinding wheel 32, depending upon the direction of rotation of the hand feed wheel 94.

In order that the grinding wheel may be moved rapidly toward or from the work piece to be ground, it is desirable to provide a fluid pressure mechanism which supplements the nut and screw feed and serves to rapidly move the grinding wheel toward or from the work. In the preferred construction, the bearing 83 for the rear end of the feed screw is arranged in axial alignment with and connected to a piston rod 98 which is connected to a piston 99 slidably mounted within a fluid pressure cylinder 100. By admitting fluid to opposite ends of the piston rod, the feed screw 81 may be moved rapidly in an axial direction to cause a rapid approaching or receding movement of the wheel slide 31 and the grinding wheel 32. If desired, the hydraulic approach for the approaching and receding movement of the wheel may be supplemented by a dash pot mechanism to slow down the rapid approach of the grinding wheel to a suitable speed for grinding the opposed cheeks at opposite ends of the crankpin being ground. This may be accomplished by means of a mechanism such as that shown in a copending U. S. patent application Serial No. 669,565 of Herbert A. Silven filed May 5, 1933, which issued as U. S. Patent No. 2,023,704 dated December 10, 1935. Complete details of this feed have not been illustrated since reference may be had to the prior patent for details of disclosure. The piston rod 98 extends through the rear cylinder head of the cylinder 100. A dash pot piston 101 is slidably mounted on the extending end of the piston rod 98. The piston 101 is surrounded by a dash pot cylinder 102. The outer end of the piston rod 98 is provided with an adjustable nut 103 which serves after a predetermined forward approaching movement of the wheel to engage and pick up the dash pot piston 101. The fluid within the dash pot chamber 104 thereafter exhausts through a needle valve 105 which serves to control the rate of feeding movement of the grinding wheel to produce the desired grinding action on the cheeks adjacent to the ends of the crankpin.

Table traverse

The work table 40 (Fig. 2) is arranged to be moved longitudinally relative to the machine base on the V-way 41 and the flat way 42. A power operated traversing mechanism is provided comprising a fluid pressure cylinder 110 which is fixed to the base 30. A piston 111 is slidably mounted within the cylinder 110 and is connected by means of a piston rod 112 which extends in opposite directions from the piston through the opposite ends of the cylinder 110 and is connected to brackets 113 and 114 which are fixed to the table 40.

Steadyrest

In the grinding of a crankshaft or any long cylindrical piece of work, it is desirable to provide a suitable work steadying rest to steady the work and prevent vibration thereof during the grinding operation. In the grinding of heavy objects, such as crankshafts, it is desirable that the steadyrest be arranged so that it is out of the way during the loading of a work piece or the removal of a finish ground crankshaft from the machine. In the preferred construction, the steadyrest (Fig. 8) is arranged so that it may be bodily moved in a vertical direction so that it may be dropped to an inoperative position out of the way for the loading operation. Such a rest may comprise a vertically movable frame 115 which is provided with a pair of opposed ways 116 and 117 which slide in a vertical slideway 118 on the front of the machine base. The upper end of the frame 115 is provided with a horizontally movable work steadying shoe 119 which is arranged to engage and steady a crankpin 120 during the grinding operation thereon. The steadyrest shoe 119 may be adjusted manually in a horizontal direction by means of an adjusting nut 121 so that the steadyrest shoe 119 may be maintained in operative engagement with the work as it is reduced in size during grinding to steady the same and prevent vibration thereof. Details of the adjustment of the steadyrest shoe 119 have not been illustrated in the present application since this adjustment is not considered part of the present invention. For further details as to this adjusting mechanism, reference may be had to my prior copending application Serial No. 31,059 filed July 12, 1935, which issued as U. S. Patent No. 2,053,878 dated September 8, 1936.

Figures 8, 10:
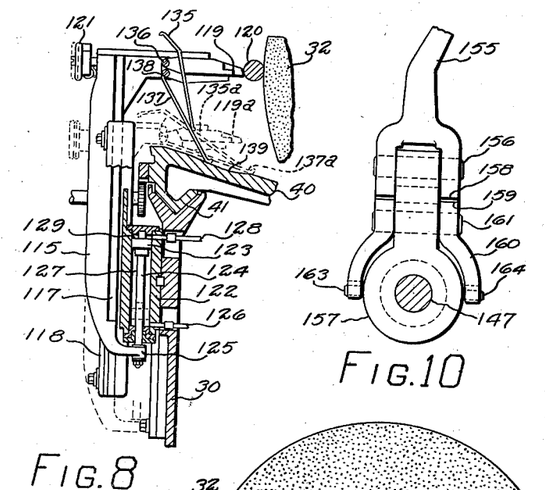
Fig. 8 is a fragmentary sectional view, showing the steadyrest and its operating mechanism.
Fig. 10 is a fragmentary elevation, on an enlarged scale, of the jogging lever and its support.

In order that the frame 115 may be readily raised and lowered to and from an operating position, a fluid pressure mechanism is provided comprising a cylinder 122 which is fixed to the front of the machine base. A piston 123 is slidably mounted within the cylinder 122 and is connected by a piston rod 124 with a projection 125 of the steadyrest frame 115. It will be readily apparent from the foregoing description that when fluid is admitted through a pipe 126 into a cylinder chamber 127, the piston 123 will be moved upwardly into the position illustrated in Fig. 8 to raise the steadyrest shoe 119 from the dotted line position 119a into the full line position 119, as shown in Fig. 8. Similarly, when fluid under pressure is admitted through a pipe 128 into a cylinder chamber 129, the steadyrest frame 115 will be moved downwardly into the dotted line position, as indicated in Fig. 8, moving the steady rest shoe 119 down into an inoperative position just above the surface of the work table 40.

Splash guard

A grinding operation of this type is usually a wet grinding operation in which a coolant fluid is conveyed onto the grinding wheel and the work piece during the grinding operation, and it is consequently necessary and desirable to provide a splash guard (Fig. 8) to prevent the coolant fluid from being thrown toward the front of the machine on to the operator or the floor adjacent to the machine. In the preferred construction, as illustrated in the drawings, a movable two-part splash guard is provided, comprising an upper splash guard member 135 which is pivotally mounted on pivot screw 136. The lower end of the upper splash guard 136 rides on the front face of a pivotally mounted splash guard 137 which is pivoted on a stud 138. The lower end of the splash guard 137 rides on a surface 139 on the table 40. When the steadyrest frame 115 is lowered to an inoperative position, the splash guard 137 rides down the surface 139 on table 40 which serves to rock the splash guard 137 in a counterclockwise direction. This movement of splash guard 137 serves to also rock the splash guard 135 in a counterclockwise direction until the two guards assume the positions 137a and 135a, as indicated in dotted lines in Fig. 8.

Work table jogging

It is desirable to provide a manually operable means for accurately positioning the work table 40 in a longitudinal direction. A fluid pressure mechanism may be used to rapidly move the table into an approximate position for grinding and then a manual adjustment of the table serves to accurately position the work piece relative to the operative face of the grinding wheel 32. In the preferred form, a manually operable jogging mechanism (Figs. 3, 9 and 10) is provided to move the work table 40 through a short distance in either direction to accurately position the same. This mechanism may comprise a rack bar 145 on the front of the table 40. A gear 146 meshes with the rack 145 and is rotatably supported on a shaft 147. The gear 146 meshes with a small gear 148 on the shaft 89. A gear 149 is formed integral with the gear 148 and meshes with a gear 150 rotatably mounted on the shaft 147. In order that the gears 150, gear 149, gear 148, and gear 146 may be rotated to move the rack 145 and the table 40 endwise, a manually operable lever 155 is pivotally mounted on a stud 156 on a bracket 157 which is fixed on the front of the shaft 147. The lower arm of the lever 155 is provided with a gear segment 158 which meshes with a gear segment 159 formed on the upper end of a yoked member 160 which is pivotally supported on a stud 161. The yoked member 160 straddles a member 162 and is connected therewith at diametrically opposite points by means of pins 163 and 164. The member 162 is provided with an internal gear 165 which is arranged to mesh with a portion of the gear 150. In the position of the parts illustrated in Fig. 9, the lever 155 may be rocked to turn the frame 157 on the shaft 147 without transmitting any motion to the table 40. When it is desired to jog the table 40 or to move the same endwise, the operator moves the jogging lever 155 in a clockwise direction, as viewed in Figs. 3 and 9. This movement serves to rock the yoked member 160 in a counterclockwise direction (Fig. 9) which serves to move the member 162 toward the right, as viewed in Fig. 9, so as to throw the internal gear 165 into mesh with the gear 150. In this position of the parts, the lever 155 may be rocked in either direction to rock the frame 157 on the shaft 147 and the rocking motion of the lever and frame 157 is transmitted through the gear 150, the gear 149, the gear 148, gear 146, to move the rack 145 and table 40 to accurately position the work piece relative to the grinding wheel. A spring-pressed plunger 167 mounted in a fixed frame 168 engages a notch 169 in the member 162 and serves to normally hold the member 162 and internal gear 165 out of mesh with the gear 150 and also serves to hold the lever 155 in a central position.

Hydraulic control

In the grinding of the crankpins on a crankshaft, it is necessary that the wheel be moved through a considerable distance in order that the table may be traversed to position successive pins in operative relation with the wheel. It is highly desirable to interlock the table traverse mechanism, the wheel feed mechanism, as well as the work unclamping in order that the table cannot be traversed when the wheel is moving toward or from the work or the wheel cannot be fed toward the work during the table traversing movement to position successive crankpins in operative relation with the wheel. Similarly, it is desirable to interconnect the hydraulic mechanism for unclamping the work piece so that the work piece cannot be unclamped during the infeeding movement of the wheel or during the traversing of the work table. This interlocking is preferably accomplished through the hydraulic system and its controlling valve. In the preferred construction, a pair of fluid pressure control valves (Figs. 2, 22, 23, 24, 25, 26 and 27) are provided, one of which serves to control the admission of fluid to the table traverse cylinder so that either a fast or a slow traverse may be obtained in either direction and a second valve is provided which serves to control the admission of fluid to the wheel feed mechanism, the steadyrest, and the work unclamping mechanism.

As illustrated in the drawings, a valve 175 which is preferably of the piston type serves to control the admission of fluid to the cylinder 110 to control the movement of the table 40 either toward the right or toward the left, both at a rapid positioning feed as well as a slow feed for accurately locating the table to position a work piece relative to the operative face of the grinding wheel or for truing the wheel. The valve 175 comprises a valve stem 176 which is formed integral with a hollow piston member having a central bore 177 and being provided with valve pistons 178, 179, 180, 181, 182, 183, 184 and 185.

Figure 22:
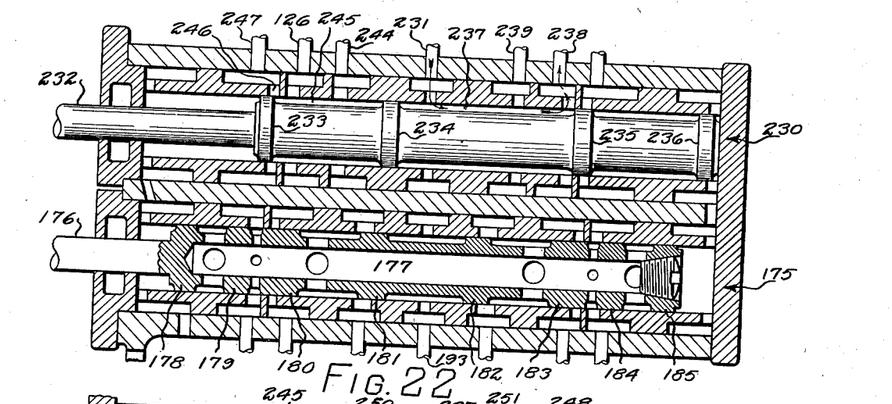
Fig. 22 is a sectional view, on an enlarged scale, through the control valve, showing the valve in position during the loading of a work piece.

Fluid under pressure is supplied from a reservoir 190 (Fig. 2) within the base 30. A pump 191 drives fluid through a pipe 192 from the reservoir 190 and forces fluid under pressure through a pipe 193 through a port 194 into a valve chamber 195 between valve pistons 181 and 182. In the position of the valve 175, as illustrated in Fig. 22, the fluid under pressure entering the valve chamber 195 is equalized between the pistons 181 and 182 and since the valve is in a neutral position causes no movement of the table 40. When the valve stem 176 is moved into the position illustrated in Fig. 23 to cause a rapid movement of the table 40 toward the left, fluid under pressure entering the valve chamber 195 passes out through a port 196, a pipe 197, into a cylinder chamber 198 to cause the piston 111 to move toward the left, as viewed in Fig. 2, to cause a corresponding movement to the left of the table 40. During this movement of the table 40, fluid is exhausted from a cylinder chamber 199 through a pipe 200 through a valve port 201, a valve chamber 202 between valve pistons 180 and 181, through a port 203 into the central aperture 177 within the valve piston 176 and out through a port 204 in the valve 176 through a valve port 205, through a pipe 206, which returns the fluid to the reservoir 190.

Figure 23:
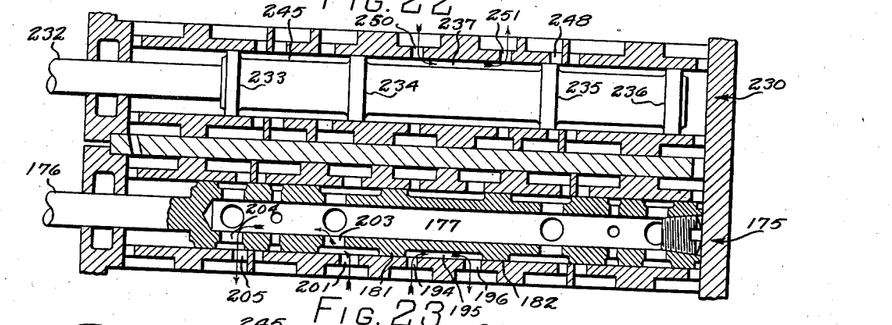
Fig. 23 is a similar sectional view through the valves when the lever is moved forward to clamp the crankshaft in place and the lever is moved toward the left to cause a fast traversing movement of the work table toward the left.
Figure 24:
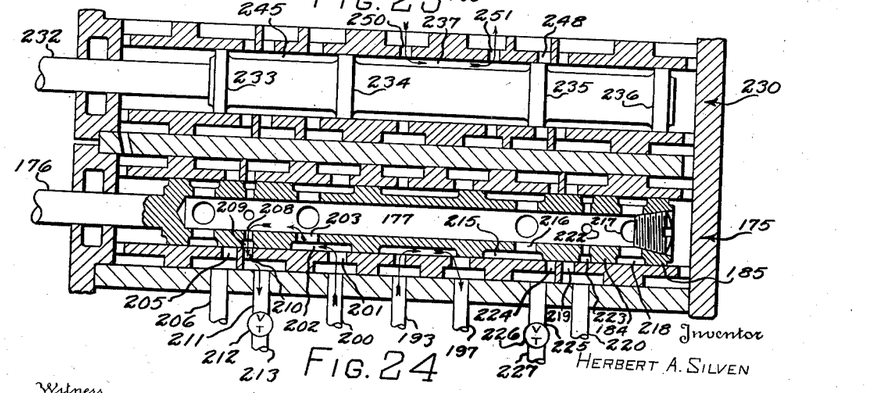
Fig. 24 is a similar sectional view through the valves positioned to cause a slow traversing movement of the table toward the left, with the steadyrest down and the wheel slide back.
Figure 25:
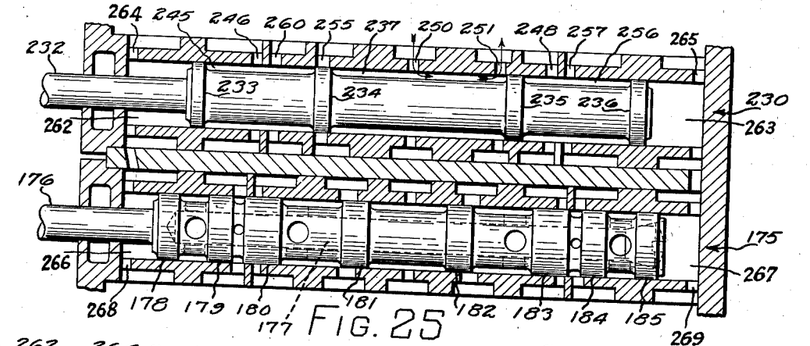
Fig. 25 is a similar sectional view through the control valves positioned to stop the work table when opposite the crankpin to be ground, with the steadyrest and the wheel slide in its rearward position.
Figure 26:
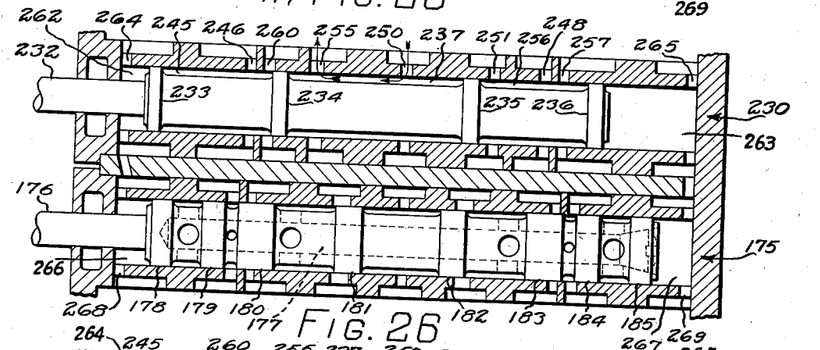
Fig. 26 is a similar sectional view through the control valves positioned so that the table is stopped opposite the crankpin to be ground and the wheel slide is moved forward while the steadyrest remains down in an inoperative position.

When it is desired to slow down the movement of the table toward the left, as above described, the valve stem 176 is moved toward the left from the position illustrated in Fig. 23 so that the valve pistons assume the positions illustrated in Fig. 24. Fluid exhausting from the cylinder chamber 199 then passes through pipe 200, port 201, port 203, into the central aperture 177 in the valve 176 and out through a port 208, into a valve chamber 209 between the valve pistons 179 and 180, and then out through a port 210, a pipe 211, an adjustable throttle or needle valve 212 (Fig. 24) and returns to the reservoir through a pipe 213. When it is desired to move the table rapidly toward the right, the valve 176 is shifted toward the left, as viewed in Fig. 24, so that fluid under pressure exhausting from the cylinder chamber 198 passes through pipe 197 into a valve chamber 215, through a port 216, into the central aperture 177 within the valve 176 and passes outwardly through a port 217, a valve chamber 218 between valve pistons 184 and 185, through a port 219, and a pipe 220 which connects with the pipe 206 and returns the fluid to the reservoir 190.

When it is desired to reduce the fast speed toward the right, as above described, the valve stem 176 is moved so that fluid from the central aperture 177 passes through a port 222, a valve chamber 223 between the valve pistons 183 and 184, through a port 224, a pipe 225, and through an adjustable throttle or needle valve 226, and out through a pipe 227 which connects with the pipe 221 to return the fluid to the reservoir 190. By adjusting the needle or throttle valves 212 and 226, the slow speed of the table in either direction may be adjusted to the desired extent.

A second control valve 230 (Figs. 22, 23, 24, 25, 26 and 27) is located directly above the table traverse control valve 175 and is arranged to control the admission of fluid to the wheel feed cylinder 100, to the steadyrest positioning cylinder 122, and also to the work clamp release cylinders 70 and 75. Fluid under pressure passes from the pump 191 through the pipe 193 to valve 175, and simultaneously passes through a pipe 231 into the valve 230. The valve 230 comprises a movable valve member 232 having formed thereon integral valve pistons 233, 234, 235 and 236. Fluid under pressure passing through the pipe 231 enters a valve chamber 237 between the valve pistons 234 and 235. In the position of the valve member 232, as indicated in Fig. 22, fluid under pressure passes out through a pipe 238 and is simultaneously admitted to cylinder chambers 72 and 77 of the work clamp release cylinders 70 and 75 respectively to simultaneously unclamp the opposite ends of the work piece. At the same time fluid under pressure is permitted to pass through a pipe 239 and through a pipe 240 into a cylinder chamber 129 to move the steadyrest frame 115 downwardly into an inoperative position. The fluid passing through pipe 239 also passes through a pipe 241 into a cylinder chamber 242 in the wheel feed cylinder 100 to cause the piston 99 to move toward the right, as viewed in Fig. 2, to move the wheel slide 31 and the grinding wheel 32 into their rearward or inoperative positions. In the position of the valve 232 as shown in Fig. 22, fluid may exhaust from a cylinder chamber 243 in the cylinder 100 through a pipe 244 into a cylinder chamber 245 between valve pistons 233 and 234 and pass outwardly through a port 246 and a pipe 247 which returns the exhaust fluid to the reservoir 190. At the same time, fluid may exhaust from the cylinder chamber 127 in the steadyrest cylinder 122 through a pipe 126 into the valve chamber 245 and out through port 246 and pipe 247 into the reservoir 190.

When a work piece has been loaded into the machine, the valve member 232 is moved into the position illustrated in Fig. 23 so that the valve piston 235 cuts off the port 248 and prevents passage of fluid through pipe 238 to the work clamp release cylinders, thereby releasing the tension of the springs 56 and 51 to clamp the work piece in operative relation with the work heads 47 and 48 respectively. In this position of the valve, fluid passing through pipe 231 enters the valve chamber 237 through a port 250 and passes out through a port 251 and pipe 239 into the cylinder chamber 242 of the cylinder 100 and pipe 240 into cylinder chamber 129 of the cylinder 122 to hold the grinding wheel and the steadyrest in their inoperative positions.

In starting the grinding operation on a crankpin, it is desirable to move the grinding wheel into grinding contact with the crankpin to be ground and to grind off the rough spots or any high spots on the pin before the steadyrest is brought into operative engagement with the crankpin being ground. To bring the grinding wheel into operative position toward the work piece, the valve 232 is shifted into the position illustrated in Fig. 26 so that fluid under pressure passing through pipe 231, through port 250, into valve chamber 237 passes outwardly through a port 255, through the pipe 244, into cylinder chamber 243 to cause the piston 99 to move toward the left, carrying the piston 99, the wheel slide 31 and the grinding wheel 32 into the position of the parts illustrated in Fig. 2. During the forward movement of the wheel slide, fluid is exhausted from the cylinder chamber 242, through pipe 241, pipe 239, through port 251, into a valve chamber 256 between the valve pistons 235 and 236 and out through a port 257 and a pipe 258 into the reservoir 190.

Figure 27:
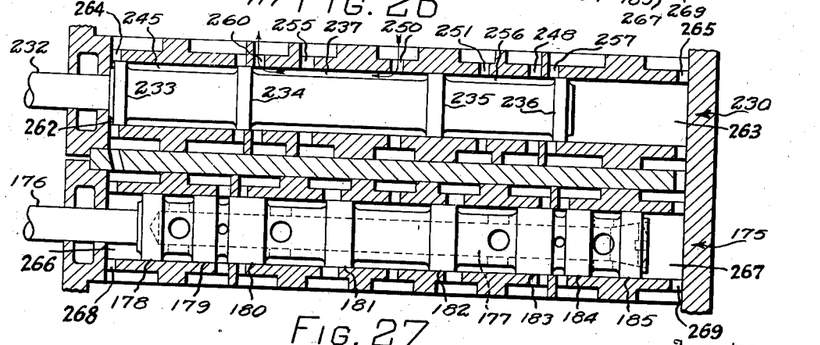
Fig. 27 is a similar sectional view through the control valve with the work table stopped in a grinding position and the wheel slide moved forward into a grinding position, and the steadyrest moved upward into an operative position with relation to the work.
Figure 28:
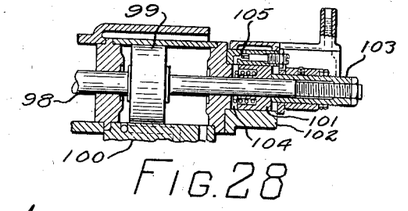
Fig. 28 is a fragmentary sectional view, on an enlarged scale, through the dashpot mechanism.

After the grinding wheel 32 and the slide 31 have advanced to the desired extent, the valve 232 is shifted into the position illustrated in Fig. 27 so that fluid under pressure from the pipe 231 entering the valve chamber 237 through port 250 passes out through port 255 and also through a port 260 and a pipe 126 into cylinder chamber 127 of the steadyrest positioning cylinder 122 to move the piston 123 upwardly to raise the steadyrest frame 115 into an operative position so that work steadying shoe 119 is in operative relation with the crankpin 120 to be ground. The end chambers 262 and 263 of the valve 230 are provided with ports 264 and 265 respectively which serve to exhaust any fluid leaking by the valve pistons and pocketing in the chambers 262 and 263. Similarly, the end chambers 266 and 267 of the valve 175 are provided with ports 268 and 269 to exhaust any fluid leaking by the valve pistons into chambers 266 and 267 and thereby prevent pocketing of oil in these chambers.

Single control lever

In order that the valves 175 and 230 may be operated jointly and in timed relation with each other to interlock the movements of the various moving parts of the machine, a single manually operable lever 270 (Figs. 1, 4, 5 and 6) is provided. The lever 270 is pivotally connected to a supporting bracket 271 by means of a stud 272. The lower end of the lever 270 is supported by a yoked member 271 which straddles the lower end of the lever 270 and is pivotally connected thereto by means of a stud 272. The yoked member 271 is rotatably supported on the base 30 by means of a stud 273 so that the main control lever may be swung toward or from the base of the machine about the axis of the stud 272 as a pivot or may be swung in a direction parallel to the base 30 by movement of the lever about the axis of the stud 273 as a pivot. The valve stem 232 is provided with a sleeve 274 fixed on the outer end of the stem. A rod 275 having slabbed-off parallel sides is fixedly mounted on projections 276 of the sleeve 274 and extends in a longitudinal direction relative to the machine base. The lever 270 is provided with a yoked member 277 which straddles the rod 275. It will be readily apparent from the foregoing that when the lever 270 is moved toward or from the machine base, pivoting about the stud 272, a corresponding movement of the yoked member 277 serves to move the rod 275, the sleeve 274 and the valve stem 232 to change the position of the valve 230. By moving the lever 270 toward or from the base, pivoting it about the axis of the stud 272, serves to control the position of the valve 230 to control the work clamp release, the wheel feed, and the steadyrest positioning mechanism. The lever 270 is arranged to be swung in a direction parallel to the base 30 about the stud 273 as a pivot and the mechanism is so connected that this movement of the lever serves to control the position of the valve 175 to control the longitudinal movement of the work table 40. The valve stem 176 is provided at its outer end with a grooved spool-shaped member 280 which is connected by a pin 281 with the long arm 282 of a bell crank lever 283 which is pivoted on a vertically positioned stud 284 supported in a bracket 285 on the machine base 30. The bell crank lever 284 is provided with a short arm 286 which is preferably in the form of a pin riding in a bushing 287 in the lever 270. The pin 286 freely fits within the bushing 287 so that the lever 270 may be moved toward and from the machine base without changing the position of the bell crank lever 283. When the lever 270 is moved either toward the right or toward the left, as viewed in Fig. 1, the bell crank 283 is rocked about its pivot 284 and shifts the valve stem 176 to change the position of the control valve 175 so as to obtain either a fast or a slow traversing movement of the table 40 either in a direction toward the right or toward the left, as viewed in Fig. 1, depending upon the position of the lever 270.

Figure 6:
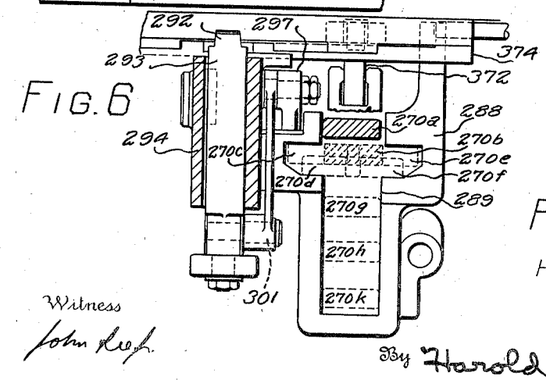
Fig. 6 is a horizontal sectional view taken approximately on the line 6—6 of Fig. 5.

In order that the movement of the control lever 270 may be rapidly positioned in one of several different positions to interlock the movements of the valves 175 and 230 so as to control the traversing movement of the work table, the feeding movement of the grinding wheel, the positioning movement of the steadyrest, and the releasing of the work clamp, it is desirable to provide a suitable guiding member to control the movements of the lever 270. As illustrated in Fig. 6, a guide plate 288 is mounted on the base of the machine 30 and is provided with a cross-shaped slot 289 therein which serves to restrict the movement of the control lever 270 in its movement toward and from the machine or longitudinally relative to the machine base. In the full line position of the lever 270a, as indicated in Fig. 6, the valves 175 and 230 are in the positions illustrated in Fig. 22, in which the position of the table 40 is stationary and fluid under pressure is admitted to work clamp release cylinders 70 and 75 to hold the work clamp in unclamped position to permit loading of the machine. When a work piece has been inserted in the work holders, the lever 270a (Fig. 6) is moved into position 270b. This movement of the lever shifts the position of the valve 232 into the position illustrated in Fig. 23, so that port 248 is closed, shutting off fluid pressure from the work clamp release cylinders and allowing the released tension of the clamping springs 56 and 51 to clamp the work piece in operative position for a grinding operation.

Then it is desirable to traverse the table 40 to position a crankpin to be ground in operative relation with the grinding wheel 32. This is accomplished by moving the lever 270 from the position 270b into position 270c, which serves to shift the control valve 176 into the position illustrated in Fig. 23, so as to cause a fast traversing movement of the table 40. When the crankpin to be ground approaches its operative position relative to the grinding wheel, the control lever 270 is moved into position 270d to move the valve 176 into the position illustrated in Fig. 24 to slow down the movement of the table 40. After the table 40 has been moved to position the crankpin to be ground in operative relation with the grinding wheel, the control lever 270 is moved into position 270g in which position the table 40 remains stopped, the steadyrest frame remains down in an inoperative position, and the wheel slide is in its rearward position. The machine is then in readiness to bring the wheel forward to start the grinding operation. This is accomplished by moving the lever 270 from the position 270g into the position 270h which serves to shift the valve member 232 into the position illustrated in Fig. 26 so that the work table remains stationary, the steadyrest remains down in an inoperative position, and fluid is admitted through a pipe 244 into cylinder chamber 243 to move the piston 99 and wheel slide 31 and grinding wheel 32 forward into operative engagement with the work. After the grinding wheel has moved forward to the desired extent, the lever 270 is shifted from position 270h (Fig. 6) into 270k which serves to shift the valve 232 so that the valves are positioned as shown in Fig. 27 so that fluid is admitted to raise the steadyrest into an operative position with relation to the crankpin being ground.

After the crankpin has been ground to the desired extent, the control lever 270 is moved from position 270k into position 270b which serves to cause the steadyrest to move downwardly to an inoperative position and to cause the wheel slide to move rearwardly to its inoperative position. The lever 270 may then be shifted either toward the right or toward the left into positions 270c or 270e depending upon whether it is desired to traverse the table toward the right or toward the left to position the next crankpin to be ground in operative relation with the grinding wheel. After the next crankpin has been positioned in operative relation with the wheel, the control lever 270 is again moved to position 270g, 270h into position 270k to hold the work table stationary while the grinding wheel is fed forward toward the work and the steadyrest is moved upwardly into an operative position relative to the crankpin to be ground.

Figure 7:
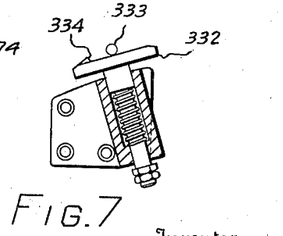
Fig. 7 is a fragmentary sectional view, on an enlarged scale, taken approximately on the line 7—7 of Fig. 4.

In order that the main control lever may be located in a predetermined forward position 270k, a spring-pressed plunger 332 is mounted in a bracket on the base 30. The plunger 332 (Figs. 4 and 7) is provided with an enlarged head which is engaged by a pin 333 on the control lever 270. The head is provided with a projecting lug 334 which serves to limit the forward movement of the lever 270 so as to locate it in the forward position 270k.

Work table locating

It is desirable to provide a locating device (Figs. 1, 4, 5 and 6) for locating the work carrying table 40 in any one of a plurality of predetermined locations for grinding the successive crankpins on a crankshaft. This mechanism may comprise a bar 290 fixed on the front of the work table. The bar 290 is provided with a plurality of spaced notches 291 which are arranged to be engaged by a pawl 292 on a transversely movable indexing plunger 293 which is slidably mounted within a supporting bracket 294 on the base of the machine. The plunger is normally held in a locating position within one of the notches 291 by means of a spring 295 which is interposed between a portion of the base 30 and the lower end 296 of a pivotally mounted lever 297. The lever 297 is pivotally mounted on a stud 298 and is connected at its upper end with a connecting link 299 by means of a pin 300. The other end of the link 299 is connected by means of a stud 301 with the outer end of the locating plunger 293. It will be readily appreciated from the foregoing disclosure that the compressed spring 295 exerts a pressure through the lever 297, link 299, to normally urge the locating plunger 293 into engagement with one of the notches 291 in the bar 290. An adjusting screw 302 is interposed between the lower end 296 of the lever 297 and the end of the spring 295 which serves to permit an adjustment of the tension of the spring 295.

The pawl 292 of the locating plunger 293 remains in engagement with a notch 291 on the bar 290 during the grinding of each crankpin. After a crankpin has been finish ground, the locating plunger 293 is withdrawn from the notch 291 of the bar 290 when the main control lever 270 is moved in a clockwise direction (Fig. 5) into a traversing position. A pin 303 on the lever 270 engages the lower end 296 of the lever 297 and rocks it in a counterclockwise direction to move the locating plunger 293 toward the left, as viewed in Fig. 5, to withdraw the pawl 292 from the notch 291 and then permit a traversing movement of the work table.

When the pawl 292 is disengaged from the notch 291 in the bar 290, the control lever 270 is in the position 270b (Fig. 6). The lever 270 may then be moved either toward the right or toward the left into positions 270c or 270e depending upon whether it is desired to traverse the table toward the right or toward the left. The table in this position of the control lever moves rapidly in the desired direction and when the next crankpin to be ground approaches a position opposite to the operative face of the grinding wheel, the operator shifts the control lever 270 from the position 270c or 270e into position 270d or 270f to slow down the traversing speed of the table 40. The movement of the lever 270 into position 270d or 270f swings the lever 270 in a counterclockwise direction (Fig. 5), thereby withdrawing the pin 304 and releasing the tension of the spring 295 which moves the lever 297 in a clockwise direction and swings the locating plunger toward the right, as viewed in Fig. 5, so that the pawl 292 engages the front surface of the bar. When the table has moved a sufficient distance so that the pawl 292 is directly opposite the next notch 291 in the bar 290, the released tension of the spring 295 snaps the locating plunger 293 into engagement with the next notch and thereby holds the table against further traversing movement.

Spark splitting

Figure 20:
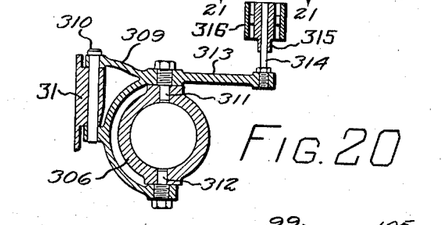
Fig. 20 is a fragmentary sectional view, taken approximately on the line 20—20 of Fig. 19.
Figure 21:
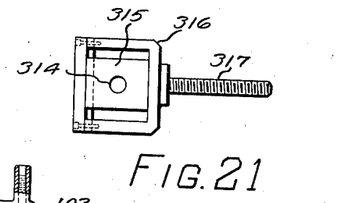
Fig. 21 is a fragmentary plan view, taken approximately on the line 21—21 of Fig. 20.

The crankshaft to be ground on a crankpin grinding machine of this type is frequently rough turned in a crank shaft lathe and the pins are not always located accurately in an axial direction, so that it is difficult to locate the table 40 by means of a sufficiently accurate spacing bar so that the grinding wheel will grind equally on opposite cheeks of the crankpin at the start of the grinding operation. It is, therefore, necessary to provide a spark splitting or jogging device (Figs. 19, 20 and 21) by which the side grinding of the wheel during the grinding of the cheeks of a crankpin may be readily equalized. In the preferred construction, the grinding wheel spindle 33 is arranged so that it may slide axially within spindle bearings 304 and 305, so that the wheel may be readily adjusted in an axial direction to equalize the side grinding of the wheel while it is grinding the cheeks of a crank pin. A collar 306 is rotatably mounted on the wheel spindle 33 and has one of its side faces bearing against a shoulder 307 on the spindle 33. A collar 308 holds the sleeve 306 against endwise movement on the spindle. A pivotally mounted yoked member 309 is pivoted on a stud 310 and connected with the sleeve 306 by means of pins 311 and 312. The yoked member 309 has a rearwardly extending arm 313 which is connected by means of a pin 314 with a transversely movable connecting block 315 slidably mounted in the head 316 of a screw 317. The screw 317 is threaded into a rotatable nut 318 which is held against endwise movement within a depending portion 319 of the wheel slide cover. The outer end of the nut 318 has an integrally formed beveled gear 320 which meshes with a beveled gear 321 on a vertical shaft 322. The shaft 322 carries a gear 323 meshing with a large gear 324 on a stud 325. The stud 325 also supports a gear 326 meshing with a large gear 327 on the stud 322. The stud 322 also carries a small gear 328 meshing with a gear segment 329 which is fixedly mounted on the lower end of the rotatable shaft 330. A manually operable lever 331 is connected on the upper end of the stud 330 and extends toward the front of the machine so that it may be readily adjusted during a grinding operation. After the work table has been located by means of the spacing bar and locating plunger, the infeeding movement of the grinding wheel is started by pulling the control lever 270 forward into position 270k, as indicated in Fig. 6. This movement starts the forward movement of the wheel. When the wheel engages the work, the side grinding is equalized by moving the spark splitting control lever 331 either toward the right or toward the left, depending upon the grinding relationship between the wheel 32 and the cheeks of the crankpins. Movement of the lever 331 transmits a rotary motion through the gear segment 329, the gear 328, the gear 327, the gear 326, the gear 324, the gear 323, the bevel gear 321, bevel gear 320, to rotate the nut 318 and thereby cause an endwise movement of the screw 317 which in turn transmits a rocking motion to the yoked member 309 which moves the grinding wheel spindle in an axial direction to the desired extent so as to split the spark or equalize the side grinding on the opposite cheeks of a crank pin.

Work stop control

Figures 16, 17:
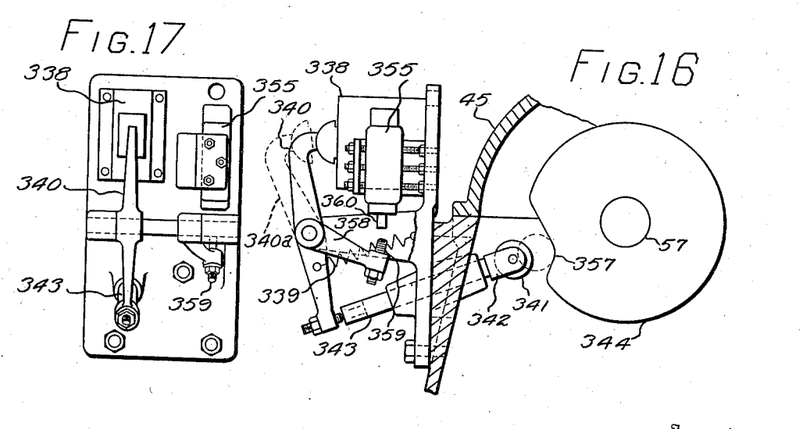
Fig. 16 is a fragmentary vertical sectional view of the cam and limit switch on the left-hand work head, taken approximately on the line 16—16 of Fig. 1.
Fig. 17 is a left-hand end elevation of the parts shown in Fig. 16.
Figure 18:
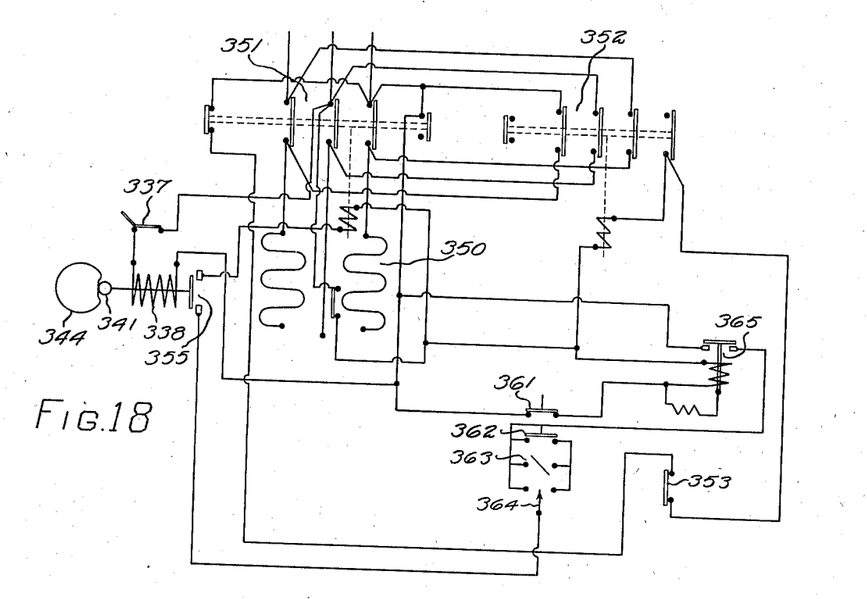
Fig. 18 is an electric wiring diagram, showing the work stop control mechanism for stopping the rotation of the work holder in a predetermined position.

In order that the work holders 47 and 48 may be automatically stopped in a predetermined vertical or upright position for loading, a suitable mechanism (Figs. 1, 16, 17 and 18) is provided which is operated in timed relationship with the control mechanism so that when the main control lever is shifted after a crankpin has been ground to move the steadyrest and the wheel slide to an inoperative position, a cam 335 carried by the sleeve 274 engages a roller 336 to open a normally closed limit switch 337. The limit switch 337 breaks the circuit to deenergize a solenoid 338 which is mounted on the rear of the work head 45. The deenergizing of the solenoid 338 releases the tension of a spring 339 which serves to rock a pivotally mounted arm 340 into a dotted line position 340a, as indicated in Fig. 16, which serves to move the roller 341 carried by a yoked member 342 on the end of a slidably mounted rod 343, so that the roller 341 may ride upon the periphery of a cam 344 which is mounted to rotate with the work supporting spindle 57.

The motor 60 for rotating the work supporting spindles 57 and 52 is preferably of a type which may be controlled by a magnetic reverse starter switch and a motor brake switch so that the rotation of the motor may be stopped in a predetermined position after a predetermined grinding operation. In the electric diagram shown in Fig. 18, the electric motor 350 is provided with two fields which are controlled by a magnetic starter switch comprising a switch 351 to control the power field of the motor 350 and a reverse field switch 352 which controls the reversing field of the motor. When the control lever 270 is shifted to stop the work rotation at the end of a grinding operation, the normally closed limit switch 337 is opened by movement of the lever which serves to deenergize the solenoid 338, allowing the follower roller 341 to move into contact with the cam 344. The movement of the follower roller 341 into operative contact with the cam 344 serves to open a normally closed trip switch 355 which opens the circuit and cuts the power from the power field of the electric motor 350. This breaking of the circuit in the power field serves through a motor brake switch 353 to close the magnetic starter switch reverse field 352 which controls the reverse field of the motor 350 to instantaneously reverse the current in the motor and to stop the motor in a predetermined position each time the work rotation is stopped. When the solenoid 338 is deenergized, the follower roller 341 is moved into operative engagement with the periphery of the cam 344 and the normally closed trip switch 355 remains closed until the follower roller 341 rides into the low point or depression 357 of the cam 344 which serves through an arm 358 and an adjustable screw 359 carried thereby to engage the plunger 360 of the trip switch 355 to open the switch and thereby cut off the power from the power field of the motor.

A safety switch 365 is mounted in the power line and serves to render the circuit inoperative in case the current fails. If the electric current supplied to the driving motor 350 fails, the switch 365 opens, and before the work rotation can be again started, the reset push button 361 must be pushed to close the circuit which in turn serves to close the safety switch 365 and thereby again start the rotation of the motor 350. A push button 362 serves as a jogging switch to jog the rotation of the work holder, if desired. A snap switch 363 in the power circuit serves in one position to permit a jogging of the work rotation by the push button 362 or in the opposite position serves to start the rotation of the motor. A second snap switch 364 in one position serves to render the automatic control of the work rotation operative and in a second position, that is moved toward the right, as viewed in Fig. 18, serves to render the manual control operative and permit a jogging of the work rotation as desired. By manipulation of the push buttons 361 and 362 and the snap switches 363 and 364, the rotation of the work driving motor may be readily controlled as desired. When the control switches are set for automatic operation, the movement of the main control lever 270 from a grinding position 270k, as shown in Fig. 6, into a position 270b, serves to render the cam 344 and the follower roller 341 operative, so that the motor will be stopped in a predetermined position, so that the work holder is in an upright or loading position.

Table jogging interlock

Figure 3:
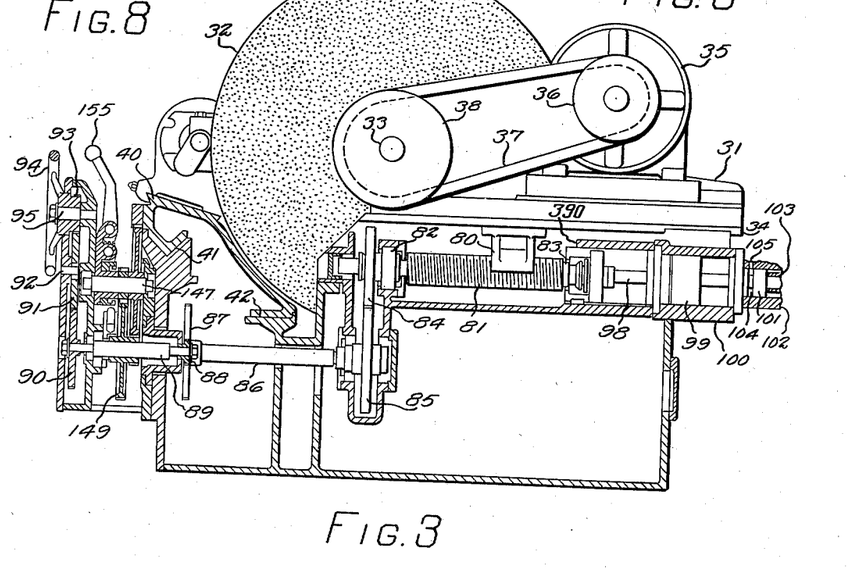
Fig. 3 is a transverse sectional view through the grinding machine, showing the wheel feeding mechanism for the grinding wheel slide and the jogging mechanism for the work table.
Figures 4, 5:
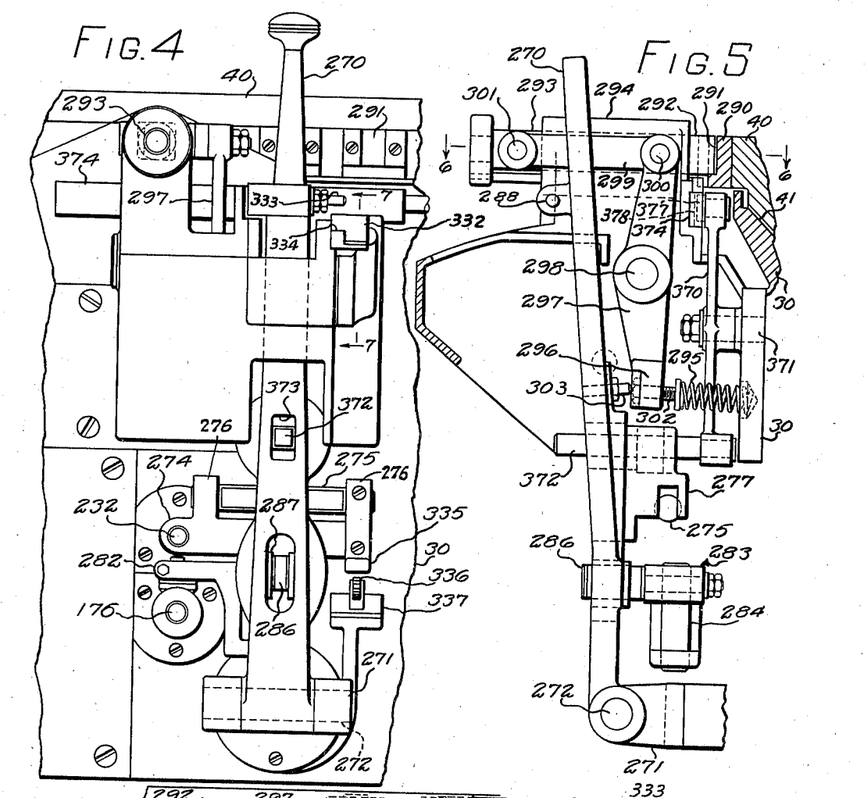
Fig. 4 is a fragmentary front elevation, on an enlarged scale, of the control mechanism on the front of the machine base.
Fig. 5 is an end elevation, partly in section, of the mechanism shown in Fig. 4.
Figure 9:
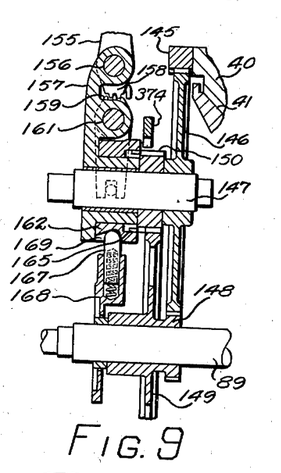
Fig. 9 is a fragmentary vertical section, on an enlarged scale, of the work table jogging mechanism as shown in Fig. 3.
Figures 11, 12, 13, 14, 15:
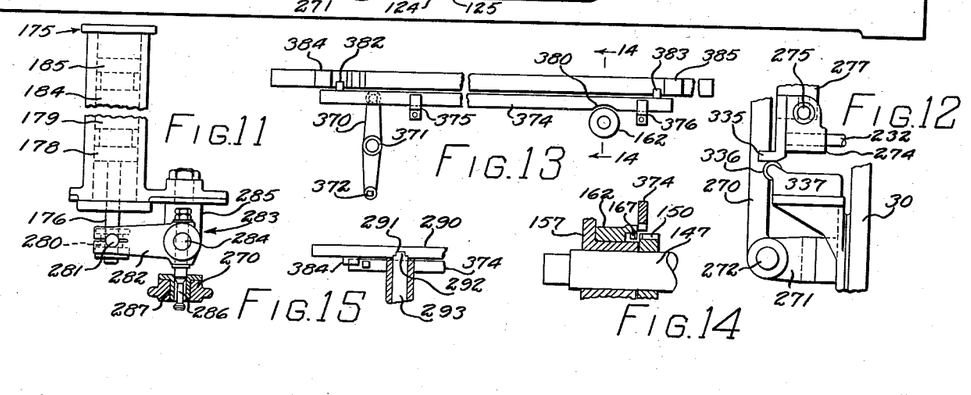
Fig. 11 is a horizontal sectional view taken approximately on the line 11—11 of Fig. 2, showing the connection between the lower control valve and the main control lever.
Fig. 12 is a fragmentary detail view, on an enlarged scale, of the main control lever and limit switch operated thereby.
Fig. 13 is a fragmentary detail view, on an enlarged scale, of the interlock between the hydraulic table traverse and the manual jogging apparatus for the table.
Fig. 14 is a fragmentary sectional view, on an enlarged scale, taken approximately on the line 14—14 of Fig. 13.
Fig. 15 is a fragmentary top plan view, partly in section, of the left-hand end of the parts shown in Fig. 13.

It is desirable to provide an interlocking mechanism (Figs. 13, 14 and 15) between the main control lever and the table jogging mechanism, as shown in Figs. 3 and 9, to prevent the table jogging mechanism from being rendered operative when the table is being traversed by the hydraulically actuated table traverse mechanism. A lever 370 is pivotally mounted on a stud 371 on the base 30. The lower end of the lever is provided with a projecting pin or stud 372 which passes through an elongated slot 373 in the main control lever 270. The width of the slot 373 forms a sliding fit with the square end of the stud 372. The elongated slot together with the square pin or stud 372 permits an in-and-out movement of the control lever toward and from the base without causing any movement of the stud 372 or the lever 370. When the lever 270 is moved in a direction parallel to the table ways, that is longitudinally relative to the machine base, a movement toward the right or toward the left of the lever causes the stud 372 to move in a corresponding direction, which serves to rock the lever 370 about its supporting stud 371 as a pivot. A bar 374 is slidably supported in brackets 375 and 376 on the base of the machine. The upper end of lever 370 is provided with a stud 377 which rides in a slot 378 in the bar 374. When the lever 370 is rocked by movement of the main control lever 270, the pin 377 through the slot 378 moves the slide bar 374 longitudinally relative to the base 30. The bar 374 is provided with a relieved portion having a partial cylindrical surface 380 which is of a sufficient radius in the position shown in Fig. 13 to permit an in-and-out movement of the internal gear 165 so that it may be thrown into mesh with the gear 150 (Figs. 3 and 9) to permit a manual jogging of the work table 40. When the table is traversed by means of the hydraulic table traverse mechanism, the lever 270 is shifted either toward the right or toward the left, depending upon the direction of traverse desired. This movement of the control lever into a table traversing position serves through slot 373 and pin 372 to rock the lever 370 which in turn serves through pin 377 and slot 378 to move the bar 374 longitudinally so that the bar 374 slides in back of the internal gear member 165 so that the partial cylindrical surface 380 is no longer concentric with the outer periphery of the member 165. The bar 374 serves to prevent engagement of the internal gear 162 with the gear 150 and thus locks the table jogging mechanism to prevent throwing the manual table jogging mechanism into operation when the table is being traversed hydraulically.

The interlocking mechanism above described also serves to prevent the table 40 from being traversed through a sufficient distance so that the heads 47 or 48 are brought into engagement with the grinding wheel 32. This is preferably accomplished by providing a pair of pins 382 and 383 in the upper surface of the bar 374. These pins are arranged to be engaged by a pair of safety dogs 384 and 385 respectively so that when the table reaches a predetermined position in its longitudinal travel toward the right, the dog 384 engages pin 382 and moves the bar 374 toward the right, as viewed in Fig. 13, which serves to rock the lever 370 in a clockwise direction. During this movement, the pin or stud 372 serves to rock the main control lever 270 in a counterclockwise direction into a neutral or central position to stop the movement of the table 40, and thereby prevent the work head 47 from being brought into engagement with the grinding wheel 32. Similarly, when the table lever is moved toward the left, as viewed in Fig. 4, to cause the work table 40 to move toward the left, the safety device above described serves to prevent the table 40 from being traversed through a sufficient distance to bring the work head 48 into engagement with the grinding wheel 32. When the table reaches its extreme left-hand position, a safety dog 385 engaging pin 383 serves to move the bar 374 toward the left, as viewed in Fig. 13, moving the lever 370 in a counterclockwise direction which in turn serves through pin 372 to rock the main control lever 270 in a clockwise direction and thereby shift the control valve and stop the movement of table 40 before the work head 48 is brought into engagement with the grinding wheel 32.

Figure 19:
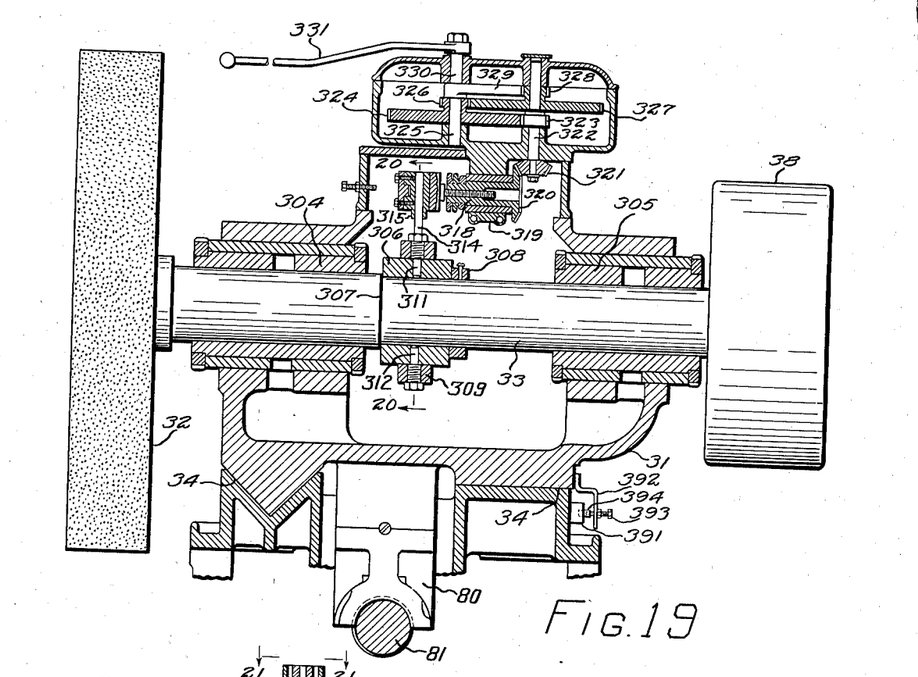
Fig. 19 is a vertical longitudinal section through the wheel slide, showing the spark splitting mechanism for moving and positioning the grinding wheel.

In order to limit the rearward movement of the wheel slide 31 so that the nut 80 cannot run into or engage the projection 390 of the intermediate slide, it is desirable to provide a suitable safety device which serves to stop the rearward movement of the slide when it reaches a predetermined position. It is desirable to cut off the fluid pressure when the wheel slide reaches a predetermined position in its rearward movement. This is preferably accomplished by mounting a normally closed limit switch 391 on the side of the intermediate slide (Fig. 19). The wheel slide 31 is provided with a cover plate 392 which is fixed to the wheel slide and extends out and around to enclose the limit switch 391. The cover plate 392 moves with the wheel slide 31 and is provided with an adjustable stop screw 393 which is arranged to engage a roller 394 on the limit switch 391 when the wheel slide 31 reaches a predetermined position in its rearward movement. The limit switch 391 is connected in one side of the power line leading to an electric motor 395 (Fig. 2) which drives the fluid pressure pump 191. During the normal feeding movement of the grinding wheel 32 either toward or from the work, the limit switch 391 is normally closed. If the wheel slide 31 moves rearwardly beyond a safe limit, that is beyond a predetermined position, the stop screw 393 engages the roller 394 on the limit switch 391 and opens the limit switch, thereby stopping the rotation of the motor 395 and the fluid pump 191. Stopping of the fluid pump 191 serves to stop the flow of fluid under pressure to the mechanisms of the machine.

Operation

The operation of this machine is readily apparent from the foregoing disclosure. The crankshaft to be ground is placed in position in the work heads 47 and 48. The control lever 270 is then moved from position 270a into position 270b which serves to relieve the pressure in the work clamp release cylinders 72 and 77 to allow the released tension of the springs 56 and 51 respectively to clamp the opposite ends of the crankshaft in driving engagement with the work heads 47 and 48 respectively. The control lever 270 is then moved either toward the right or toward the left to traverse the table 40 to position the crankpin to be ground in operative relation with the grinding wheel. The operator shifts the control lever 270 from position 270b into either position 270c or 270e, depending upon the direction it is desired to traverse the table 40 to position the next crankpin to be ground in operative relation with the grinding wheel. This movement of the control lever 270 serves to traverse the table at a fast positioning speed to rapidly bring the crankpin into an operating position. When the crankpin approaches an operating position, the operator shifts the control lever 270 from position 270c into position 270d or from position 270e into position 270f to slow down the speed of movement of the table 40. When the table positioning plunger or pawl 292 coincides with the notch 291 on the spacing bar 290, the released tension of the spring 295 serves to throw the plunger 292 into engagement with the notch 291 to hold the table in a fixed position for grinding the crankpin. The operator then moves the lever 270 through the position 270c into position 270h to cause the wheel 32 to move toward the crankpin to be ground. The wheel first approaches the crankpin at a rapid positioning rate and then the dash pot piston 101 is rendered operative to slow down the infeeding movement of the grinding wheel to a cheek grinding feed. When the wheel approaches the work, the lever 331 is manipulated to move the grinding wheel spindle 33 axially within its bearings to equalize the grinding on the opposite sides of the wheel 32 as it is fed down the sides of the crankpin so that the spark is split equally between the opposite sides of the wheel. This splitting of the spark serves to cause a substantially equal wear on the opposite side faces of the grinding wheel. When the cheeks have been ground to the desired extent, the hand wheel 94 may be turned to rotate the feed screw 81 to feed the grinding wheel toward the axis of the crankpin to grind the body of the pin to the desired size. In the preferred operation of this machine, a dial gauge is utilized which may be pivotally mounted on the wheel guard so that it may be swung into operative engagement with the crankpin during the grinding thereof so that the hand feed wheel 94 may be rotated to cause an infeeding movement of the grinding wheel while the dial indicator is watched to indicate the size of the piece of work during grinding. When the grinding wheel engages the body of the crankpin, the control lever is moved from position 270h into position 270k to admit fluid and cause the steadyrest frame 115 to be raised into an operating position with the steadyrest shoe 119 in operative relation with the crankpin 20. As the wheel 32 engages the body of the pin, the steadyrest adjusting knob 121 may be adjusted to maintain the shoe 119 in operative engagement with the pin 120 during the grinding operation to steady the shaft and prevent vibration thereof during the grinding operation.

After the crankpin 120 has been ground to the desired size, the hand wheel 94 is turned to move the wheel rearwardly by an amount equal to or slightly greater than the infeeding movement, and the control lever 270 is simultaneously moved from a position 270k into position 270b. This movement of the control lever 270 serves to cause the wheel slide 31 of the grinding wheel 32 to move rearwardly to an inoperative position and causes the steadyrest frame 115 to move downwardly into an inoperative position, such as that shown in dotted lines in Fig. 8 and in full lines in Fig. 1. The control lever 270 may then be moved from position 270b into position 270c or 270e, depending upon the direction it is desired to move the table to position the next crankpin in operative relation with the grinding wheel. When the next crankpin approaches the grinding position, the control lever 270 is moved into positions 270d or 270f to slow down the speed of the table before the positioning plunger 292 engages the next notch 291 on the spacing bar. The lever 270 may then be shifted through positions 270g, 270h and 270k to grind the next pin to the desired predetermined size. This sequence of operation is continued until all of the crankpins which are aligned with each other are ground, the crankshaft being then indexed within the holders 47 and 48 and the remaining pins ground on successive indexing operations of the crankshaft.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:—

1. A crankpin grinding machine comprising a base, a transversely movable wheel slide, a rotatable grinding wheel carried by said slide, a longitudinally movable table, a pair of opposed aligned rotatable crankshaft clamping heads on said table which are arranged to grip the opposite ends of a crankshaft and to hold the same, a movable steadyrest arranged to be moved toward and from an operating position, means including a single control lever which is arranged to control the transverse movement of the grinding wheel, the longitudinal positioning movement of the table, and the positioning of the steadyrest, means to rotate said work heads, and means actuated by the control lever to stop the rotation of the work heads in a predetermined loading position.

2. A crankpin grinding machine comprising a base, a transversely movable wheel slide, a rotatable grinding wheel carried by said slide, a longitudinally movable table, a pair of opposed aligned rotatable crankshaft supporting and rotating heads, a steadyrest which is movable to and from an operating position, means including a single control lever which serves to control the transverse movement of the wheel slide, the longitudinal positioning movement of said table, and the positioning movement of the steadyrest, means including an electric motor to synchronously rotate said work heads, and means including a limit switch actuated by said main control lever to stop the rotation of said motor and work heads with the work holders in a predetermined loading position.

3. A crankpin grinding machine comprising a base, a transversely movable wheel slide mounted thereon, a rotatable grinding wheel on said slide, a longitudinally movable work supporting table, a rotatable work support thereon, means to rotate a work piece mounted on said support, a steadyrest arranged to engage and steady a crankpin during the grinding operation, means including a fluid pressure piston and cylinder to move said steadyrest vertically to an inoperative position, means including a fluid pressure piston and cylinder to feed the grinding wheel toward or from the crankshaft, means including a fluid pressure piston and cylinder to move said work table longitudinally to position successive crankpins in operative relation with said grinding wheel, a control valve arranged to control the admission of fluid to said steadyrest and wheel slide cylinders to control the hydraulic movement of the wheel slide and the positioning movement of said rest, a second control valve arranged to control the direction and speed of movement of said table, and a manually operable control lever which is connected to actuate both of said valves to control the table positioning movement, the wheel slide movement, and the steadyrest positioning movement.

4. A crankpin grinding machine comprising a base, a transversely movable wheel slide thereon, a rotatable grinding wheel on said slide, a longitudinally movable table, opposed rotatable work heads on said table, work clamps on said heads which are arranged to clamp the opposite ends of a crankshaft in operating position on said head, means including a pair of fluid pressure pistons and cylinders operatively connected to release said work clamps, a steadyrest arranged to be moved vertically to and from an operating position, a fluid pressure piston and cylinder to move said steadyrest to and from an operating position, a fluid pressure piston and cylinder to move the wheel slide transversely either toward or from the crankpin to be ground, means including a fluid pressure piston and cylinder to traverse said table longitudinally to position successive crankpins in operative relation with the grinding wheel, a control valve arranged to control the admission of fluid to said wheel slide cylinder to cause the wheel to move either toward or from the crankpin being ground, to admit fluid to said steadyrest cylinder to cause the steadyrest to move either to or from an operating position, to admit fluid to said work clamp release cylinders to unclamp the finish ground crankshaft, a control valve arranged to admit fluid to either end of the table traverse cylinder to traverse the table in either direction at either a fast or a slow speed to position successive crankpins in operative relation with the grinding wheel, and a manually operable control lever which is operatively connected to actuate both of said control valves.

5. A crankpin grinding machine comprising a base, a transversely movable wheel slide supported thereon, a rotatable grinding wheel carried by said slide, a longitudinally movable table, opposed rotatable work heads on said table, clamps on said heads which are arranged to clamp the opposite ends of a crankshaft in operating position on said heads, means including a pair of fluid pressure pistons and cylinders operatively connected to release said work clamps, a steadyrest arranged to move vertically to and from an operative position, a fluid pressure piston and cylinder to move said steadyrest to and from an operating position, a fluid pressure piston and cylinder to move the wheel slide transversely to move the grinding wheel either toward or from the crankpin to be ground, means including a fluid pressure piston and cylinder to traverse said table longitudinally to position successive crankpins in operative relation with the grinding wheel, a control valve arranged to control the admission of fluid to said wheel slide cylinder to cause the wheel to move either towards or from the crankpin being ground, to admit fluid to said steadyrest cylinder to cause the steadyrest to move either to or from an operating position, to admit fluid to said work clamp release cylinder to unclamp the finish ground crankshaft, a control valve arranged to admit fluid to either end of the table traverse cylinder to traverse the table in either direction at either a fast or a slow speed to position successive crankpins in operative relation with the grinding wheel, and a control lever which is operatively connected to actuate both of said valves, said connections being arranged so that when the lever is moved in one direction it serves to actuate the first valve controlling the admission of fluid to the wheel slide cylinder, the steadyrest cylinder, and the work clamp release cylinder, and when moved in a second direction serves to actuate the second control valve to control the direction and speed of movement of the work table.

6. A crankpin grinding machine comprising a base, a transversely movable wheel slide, a rotatable grinding wheel on said slide, a longitudinally movable table, a pair of opposed, aligned, rotatable work heads on said table which are arranged to grip the opposite ends of a crankshaft and to hold the same with successive crankpins in alignment with the axis of rotation thereof, means including a fluid pressure piston and cylinder to move the wheel slide transversely toward or from the crankpin to be ground, means including a fluid pressure piston and cylinder to move the table longitudinally to position successive crankpins in operative relation with the grinding wheel, means including an electric motor to synchronously rotate said work holders, means including a manually operable control lever and a fluid pressure control valve actuated thereby to control the transverse movement of the wheel slide and the longitudinal positioning movement of the crankshaft, and an electrical control apparatus including a motor brake switch which is rendered effective by movement of said main control lever to stop the work holders in a predetermined loading position.

7. A grinding machine comprising a rotatable grinding wheel, a transversely movable wheel slide to support said wheel, a longitudinally movable work table, fluid pressure means including a piston and cylinder to reciprocate said table, a valve to control the admission of fluid to said cylinder to traverse said table longitudinally in either direction, a manually operable control lever to actuate said valve, a jogging mechanism arranged to jog the work table longitudinally, a manually operable lever to actuate said jogging mechanism, an interlock between said manually operable lever and said jogging lever which is arranged to hold the jogging lever in an inoperative position during the hydraulic table traverse.

8. A grinding machine comprising a rotatable grinding wheel, a transversely movable wheel slide to support said wheel, a longitudinally movable work table, means including a fluid pressure piston and cylinder to traverse said table longitudinally in either direction, a control valve to admit fluid to either end of said cylinder, a manually operable control lever to actuate said valve, a normally inoperative table jogging mechanism including a manually operable lever, and an interlock between said manually operable table jogging mechanism and said control lever which serves to prevent movement of the control lever and valve when the manual jogging mechanism is operative.

9. A grinding machine comprising a base, a rotatable grinding wheel, a transversely movable slide supporting said wheel, a longitudinally movable work table, means including a fluid pressure piston and cylinder to move the wheel slide toward or from the work table, means including a fluid pressure piston and cylinder to traverse the work table longitudinally, means including a fluid pressure pump and control valve to convey fluid under pressure for said cylinders, an electric motor to drive said pump, and a limit switch interposed between the wheel slide and base which is arranged to stop the pump driving motor when the wheel slide reaches a predetermined rearward position to stop the flow of fluid under pressure to said cylinders and valve.

10. A crankpin grinding machine comprising a base, a transversely movable wheel slide, a rotatable grinding wheel carried thereby, a longitudinally movable table, a pair of opposed aligned rotatable work supporting and clamping heads thereon which are arranged to support a crankshaft, a movable steadyrest, means including a control lever to control the movement of the grinding wheel slide toward and from the crankshaft support, the longitudinal positioning movement of the crankshaft support, the positioning movement of the steadyrest, means including an electric motor synchronously to rotate said work heads, and electrical control apparatus for said motor including a limit switch which is actuated by and in timed relation with the control lever to stop the rotation of the crankshaft supporting heads when they are in a predetermined loading position.

HERBERT A. SILVEN.